United States Patent [19]

Mundus et al.

[11] 4,061,458

[45] Dec. 6, 1977

[54] APPARATUS FOR PROCESSING A WEB OF MATERIAL WITHOUT A STANDSTILL

[75] Inventors: Friedhelm Mundus; Horst Schneider, both of Lengerich, Germany

[73] Assignee: Windmoller & Holscher, Lengerich, Germany

[21] Appl. No.: 703,934

[22] Filed: July 9, 1976

[30] Foreign Application Priority Data

July 9, 1975 Germany ............................ 2530636

[51] Int. Cl.² ........................................ B29C 17/00
[52] U.S. Cl. .................... 425/392; 425/289; 425/317; 425/395
[58] Field of Search ............... 425/289, 317, 455, 392, 425/DIG. 200, 72, 394, 395

[56] References Cited

U.S. PATENT DOCUMENTS

| 3,399,262 | 8/1968 | Quackenbush et al. ......... 425/392 X |
| 3,530,029 | 9/1970 | Lemelson ......................... 425/317 X |
| 3,702,225 | 11/1972 | Deakin et al. ................... 425/289 X |
| 3,825,393 | 7/1974 | Bittner et al. ......................... 425/392 |
| 3,954,367 | 5/1976 | Ambler et al. ....................... 425/289 |

*Primary Examiner*—Robert L. Spicer, Jr.
*Attorney, Agent, or Firm*—Fleit & Jacobson

[57] ABSTRACT

A continuously travelling web of material is processed at longitudinal intervals between a pair of confronting transverse processing tools. The tools are mounted on carriers guided in pairs on endless chains to follow a path composed of two parallel straight sections joined at the ends by semi-circular sections, the latter being relatively adjustable. The chains are guided on adjustable sprockets so that their runs are parallel and overlap. Confronting extensions of interconnecting hinge pins for the links of the chains are engageable in recesses provided in the tool carriers.

8 Claims, 15 Drawing Figures

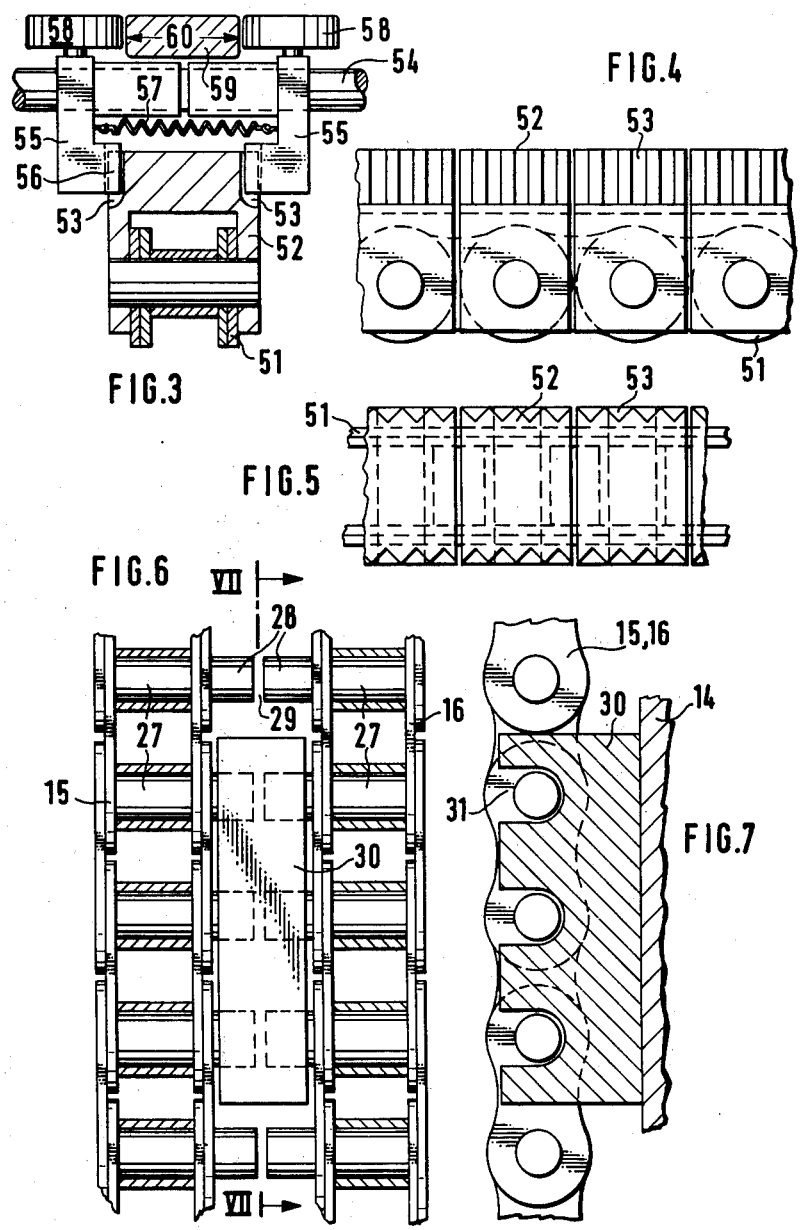

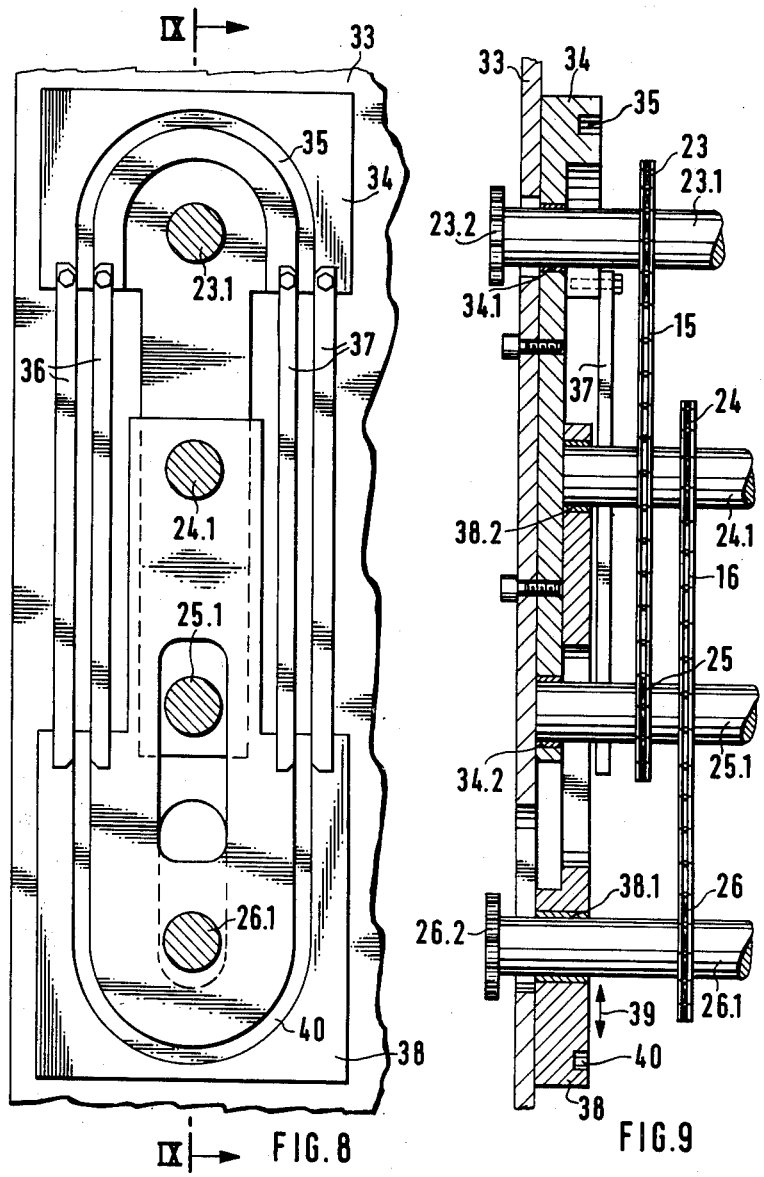

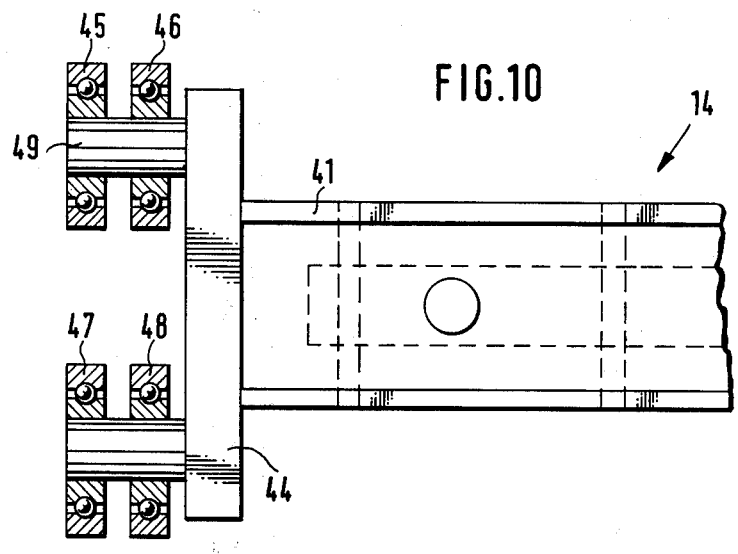
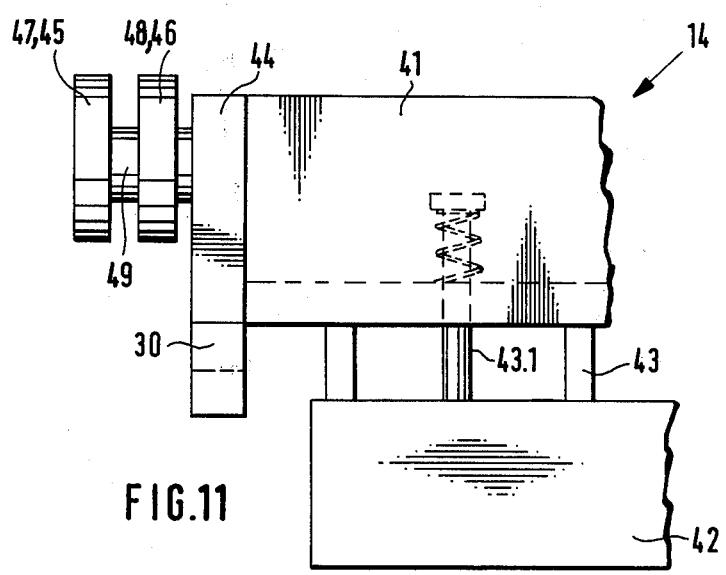

APPARATUS FOR PROCESSING A WEB OF MATERIAL WITHOUT A STANDSTILL

The invention relates to an apparatus for processing a web of material without a standstill at positions disposed at particular longitudinal intervals from one another, comprising a plurality of tool carriers which are guided in pairs of endless chains along and to both sides of a planar processing path followed by the web and which serve to attach oppositely operative tools disposed transversely of the web and enclosing the web therebetween, the tool carriers being guided in endless circulating paths.

DL-PS No. 98 056 Germany discloses a welding apparatus for webs of film for the continuous manufacture of bags or sacks, which comprise welding and pressure rams secured to circulating chain tracks. This apparatus can be adapted to different sizes of the workpieces to be processed by extending or shortening the chains which, of course, involves cumbersome adjustment.

In a machine of the aforementioned kind known from DT-PS No. 2,104,082 Germany for processing, preferably welding and separating, a double web, particularly a thermoplastic tubular film, the tool carriers are simultaneously introduced in pairs at adjustable spacings into a vertically extending processing path by a controllable feeding apparatus. In the processing path, they clamp the chains between each other by means of co-operating clamping faces so as to be carried along thereby. After passing through the processing path, the tool carriers are released and returned to the feeding apparatus by means of special return chains whick likewise extend vertically. After release from the driving chains, the tool carriers drop into the lower reversing curves in which they pendulate until they are engaged by the drive cams of the return chains and fed along the ascending return path of the feeding apparatus. Depending on the nature of the pendulating motion, the tool carriers strike the driving cams of the return chain to a greater or smaller extent. Since the intensity of the impact increases with the speed of the machine, narrow limits are set on such speed.

To avoid the pendulating motion of the tool carriers in the lower reversing curves and thereby increase the machine speed, an apparatus of the aforementioned kind known from DT-PS No. 2,263,885 Germany provides for catching chains for the tool carriers to prevent relative motion between the tool carriers and the catching chains opposite to the circulating direction. The return chains circulating at a higher speed than the catching chains receive the tool carriers with their driving cams from the catching chains. The intensity of impact between the driving cams and the opposite faces of the tool carriers is thereby determined by the speed difference between the return chain and the catching chain. At high machine speeds, considerable accelerations occur during transfer of the tool carriers between the catching chains and return chains on the one hand and the return chains and the driving chains on the other hand, such accelerations causing irregular running of the machine and substantial wear of the chains. This wear prevents a further increase in the machine speed.

It is therefore an object of the invention to provide a machine of the aforementioned kind which, even at high performance, operates with little wear, economically and quietly but which nevertheless can be simply set to different sizes of the workpieces to be processed.

This object is achieved in an apparatus of the aforementioned kind in that the semi-circular guide path curves of the circulating paths, which curves are connected by rectilinear guide path sections entering at a tangent, are displaceable and settable relatively to one another to change their lengths, but the tool carriers are movable along the circulating paths by juxtaposed parallel and overlapping endless chains guided over sprockets of which the shafts are relatively displaceable and settable in pairs in a manner corresponding to the displaceable portions of the circulating paths, the runs of the chains extending in one plane at the zone of overlap, that the link pins or lugs of the chains are provided with extensions which, in the overlapping section, are directed towards one another and leave a gap between each other, and that the tool carriers moving in circulating paths have at least two receptacles engaging a corresponding number of successive extensions, the receptacles being of a width such that they couple both opposed extensions in the overlapping section, at the start of which the extensions of one chain enter the receptacles and at the end of which the extensions of the other chain leave same. To alter the spacings between successive tools in the apparatus according to the invention, it is merely necessary to move towards or away from one another the end curves of the circulating paths and thus at the same time the chains that carry the tool carriers along the circulating paths, namely in a manner such that a length of circulating path is obtained over which the tool carriers can be distributed at the desired uniform intervals. Since the tool carriers are coupled to the extensions on the chains only by the receptacles formed by their drivers, they can be readily displaced along the chains to change the intervals without requiring costly adjustment or reconstruction work.

Desirably, the shafts of each pair of relatively displaceable chains are mounted on carriers or supporting plates which are connected to a respective one of the relatively displaceable parts of the circulating paths. In this way, the effective chain length can be adapted to the length of the circulating path simultaneously with displacement of the parts of the circulating path for the adjustment thereof.

The guide path may be formed in two parts, the shafts of the two relatively displaceable pairs of chains being mounted on each of the relatively displaceable parts.

Advantageously, each guide path may also be formed in three parts, three pairs of chains being provided and the central pair being fixed and the two outer pairs being displaceable relatively to the central pair. If such an apparatus is provided with only four tools and associated carriers, the intervals between the tool carriers can be changed in a simple manner in that two tools are moved into the crests of the reversing curves of the guide paths and the displaceable portions of the circulating paths are relatively displaced to set the desired intervals.

In a further embodiment of the invention, drivers on which the tool carriers are releasably secured are connected to the link pins or elements to permit a finer setting of the intervals between the tools than that prescribed by the chain pitch. The drivers may comprise lateral teeth engaged by disengageable racks of the tool carriers. The racks may be displaceably mounted on a carrier and held in engagement with the teeth of the driver by a catch spring. To lift the racks from the driver, the racks may be provided with rollers cooperating with control cams for spreading same. The chains can then be pulled in the desired manner between the racks of the tool carriers spread by the control cams.

In the apparatus according to the invention, the tools secured on the tool carriers need not only be welding or separating welding tools but can also be tools for feeding carrying handles, valves and like workpieces, for example for making bags or sacks.

Examples of the invention will not be described in more detail with reference to the drawing, in which:

FIG. 3 is a partial cross-section of a clamping apparatus showing part of a tool or a tool carrier;

FIG. 4 is a side elevation of FIG. 3 without clamping apparatus; FIG. 5 is a plan view on the chain with drivers according to FIG. 3;

FIG. 6 is a plan view of two juxtaposed chains with extensions and a drive member;

FIG. 7 is a section on the line VII—VII in FIG. 6;

FIG. 8 is a side elevation of a tool guide path;

FIG. 9 is a section on the line IX—IX in FIG. 8;

FIG. 10 is a plan view of a tool;

FIG. 11 is a side elevation of the tool of FIG. 10;

Figure 1:
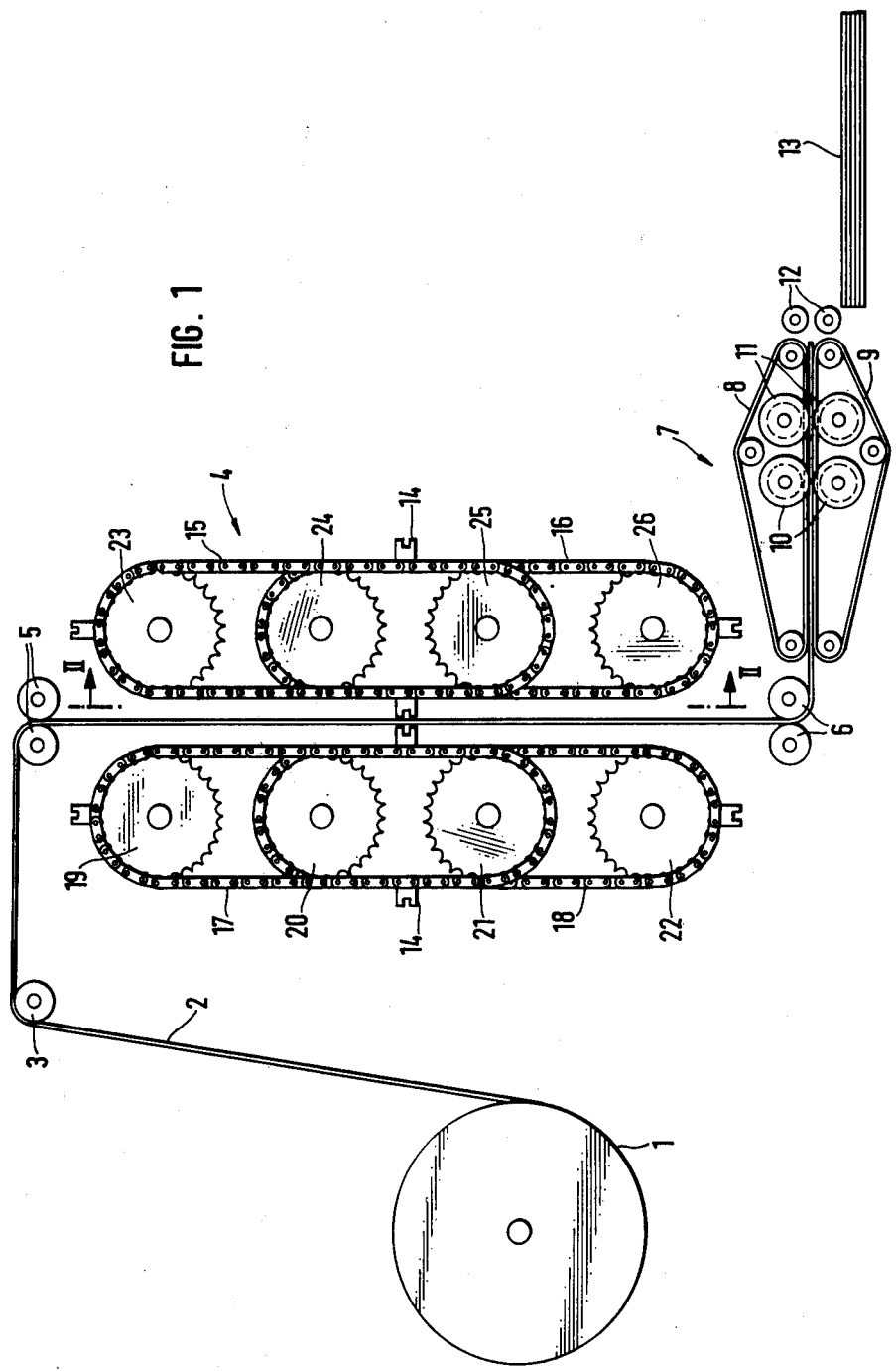
FIG. 1 is a diagrammatic side elevation of a bag welding machine.

In the apparatus diagrammatically illustrated in FIG. 1, a tubular web 2 of plastics film is withdrawn from a supply reel 1 and fed by a pair of tensioning rollers 5 by way of a guide roller 3 to a processing station 4 and transferred by a pair of tensioning rollers 6 to a severing station 7 after processing. The latter consists of conveyor belts 8, 9 and two pairs of tear-off rollers 10, 11. The conveyor belts are sub-divided into juxtaposed groups of belts and the pairs of tear-off rollers 10, 11 comprise grooves in which the individual belts run. By means of the larger diameters disposed between the grooves, the pairs of tear-off rollers 10, 11 engage the bag tube and sever bags therefrom along the transverse seam by means of differential circumferential speed. The individual bags or sacks severed from the transversely welded web at the severing station are deposited on a depositing table 13 by profiling rollers 12. Instead of the depositing table 13, there could also be a depositing cylinder, a collecting cylinder or a coiler for winding small rolls.

In the processing station 4 there are welding or separating welding tools 14 arranged on pairs of chains 15 to 18 which pass over pairs of sprockets 19 to 26 at the same speed as the web 2. The web 2 is processed when two confronting welding or separating welding tools 14 meet. The welding process is effected by a current impulse fed to the welding tool from a suitable voltage source by way of a brush contact (not shown). The intervals between the welds or the widths of the welded bags or sacks are determined by the spacings at which the welding tools 14 are secured on the chains 15 to 18.

Figure 2:
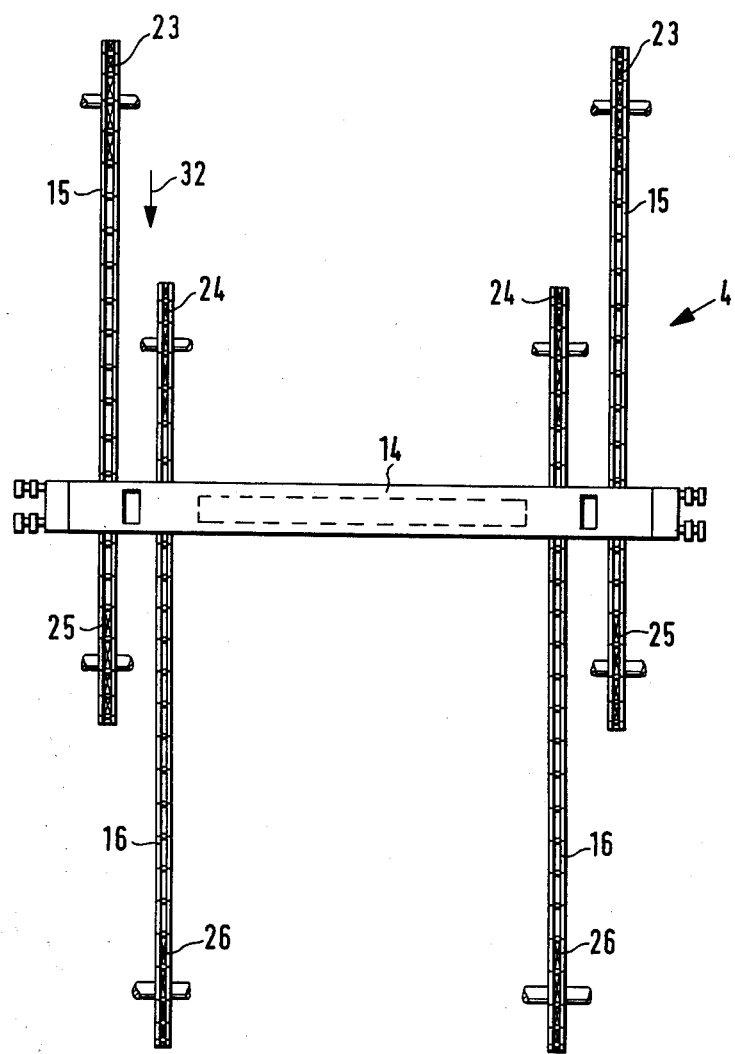
FIG. 2 is a diagrammatic representation of the drive chains in section on the line II—II in FIG. 1.

FIG. 2 shows a detail of FIG. 1 processing station 4 in plan view. The sprockets 23, 25 or chains 15 are not aligned with the sprockets 16 but are disposed next to same. The tools or tool carriers 14 are first of all fed by the chains 15 and then transferred to the chains 16 and finally again taken over by the chains, and so on. The shafts of a pair of sprockets, for example the sprockets 23 and 25, are displaceable relatively to the others which are rotatable in the frame. By relative displacement of the sprocket shafts in pairs, the effective length of a circulating path defined by the chains can be altered. By corresponding adjustment of the tool carriers on the chains, their intervals and thus the length or width of the welded bags can then be changed.

The adjacent chains 15 and 16 disposed between the sprockets 24 and 25 are illustrated in FIG. 6. Their link pins 27 comprise attachments 28 pointing to the respective opposite chain. Between the ends of each pair of attachments 28 there is only a narrow gap 29. Driving of the tools or tool carriers 14 is effected by drivers 30 secured to the tool carriers. Each driver 30 comprises several grooves 31 of which the spacings correspond to the spacings of the link pins and which engage over the attachments 38. The width of the drivers 30 is such that the attachments 28 are securely engaged in pairs. By means of the drivers 30, the tools are easily transferred from one chain to the other in so far that the attachments of the chain 16 enter the grooves 31 of the driver 30 and the attachments of the chain 15 leave the grooves 31 at the sprocket 25 when the chains are fed in the direction of the arrow 32. The tools 14 are led in guides so that the drivers 30 will always assume the correct position with respect to the chains and the web to be processed.

FIG. 8 illustrates an elevation of a tool guide and the mounting of the sprocket shafts and FIG. 9 is a section on the line IX—IX in FIG. 8. The sprockets 23 are secured to shafts 23.1 and the sprockets 24 to shafts 24.1 and so on. The shafts 23.1 and 26.1 project beyond a wall 33 of the frame and at their ends carry sprockets 23.2 and 26.2 by which the chains 15 or 16 are driven. Screwed to the wall 33 there is a guide member 34 comprising bearings 34.1 and 34.2 for the shafts 23.1 and 25.1, a cam member 35 and pairs of guide rails 36, 37. A further guide member 38 is connected to the wall 33 with the possibility of adjustment in the direction of the double arrow 39. In it there are provided bearings 38.1 and 38.2 for the shafts 24.1 and 26.1 as well as a cam member 40.

FIGS. 10 and 11 show to a somewhat larger scale than FIGS. 8 and 9 a tool 14 having guide rollers on both sides, the guide rollers of only one side being shown. The tool 14 consists of a welding member or a tool carrier 41 and a welding jaw 42, which are interconnected in known manner by spring bolts 43.1 which press the welding jaw 42 against supports 43 fixed to the welding member 41. A bar 44 on which guide rollers 45 to 48 are rotatably mounted on pins 49 seated securely in the bar 44 and with which the driver 30 is screw connected is secured to the welding member 41. The guide rollers 45, 47 run in the cam members 35 and 40 and the guide rollers 46, 48 run between the guide rail pairs 36, 37. In this way the tool 14 is exactly guided relatively to the chains and to the web 2 to be processed.

The pitch of the grooves 31 of the driver 30 or the spacing between the attachments determines the smallest variable interval between the transverse welds. Smaller intervals can be achieved by the construction shown in FIGS. 3 to 5 and 12. FIG. 3 shows a chain 51 of which each link possesses a driver 52 of which the head has teeth 53 on both sides. A bar 54 to which clamping members 55 are displaceably secured is provided on the tool 14. The clamping members 55 have teeth 56 engageable with the teeth 53 of the driver 52. An intimate connection between the two sets of teeth 53, 56 is achieved by a spring 57 having its ends secured to the clamping members 55. Loosely rotatable rollers 58 are connected to the clamping members 55 and between these there is a control cam 59 which is fixed with respect to the frame and has a variable width in the direction of the chain 51. On the one hand, the control cam is, as shown in FIG. 3, smaller than the spacing between the rollers 58 when the clamping members 55 are in mesh with the teeth 53. The width is designated 60. The second width of the control cam, designated 60.1, is such that the clamping members 55 are released from the teeth and the chain 51 can pass between the clamping members without touching same. Each tool carrier 41 has one of the FIG. 3 clamping units 55 to 58 for each chain 15 or 16.

Figure 12:
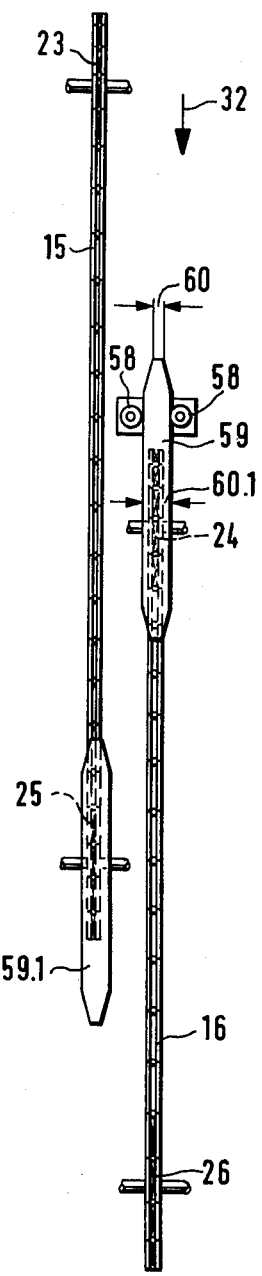
FIG. 12 is a diagrammatic representation of the arrangement of the control cams relatively to the sprockets.

FIG. 12 shows the position of the control cam 59 with respect to the sprockets 24 and 25. When the tool carrier (not shown) is brought up by the chain 15 in the direction of the arrow 32, the rollers 58 will there run on the control cam 24 at the position where it has the width 60. They are moved apart up to the width 60.1. The clamping members 55 now reach both sides of the driver 52 of the chain 16 guided by the sprocket 24. By means of the control cam 59 associated with the sprocket 25, the clamping unit 55 to 58 which until then had connected the tool carrier to the chain 15 is released by the control cam 59.1 in the same manner as just described so that the tool carrier is now only advanced by the chain 16.

Figure 13:
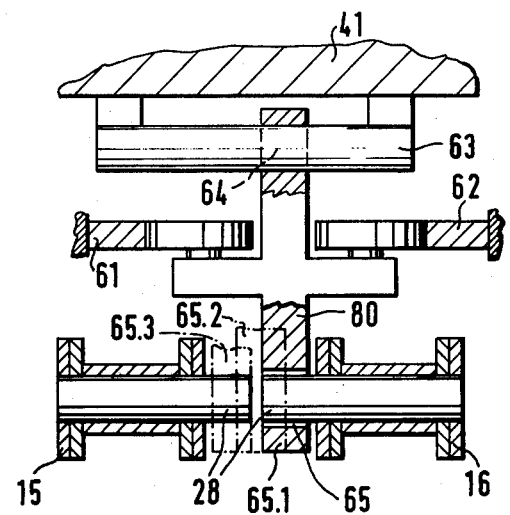
FIG. 13 is a view of a cam-controlled driver.

FIG. 13 illustrates a driver 80 of which the guide 64 is displaceably mounted on a rod 63 connected to the tool carrier 41 and of which the driver aperture 65 fits with play over attachments 28 of the link pins of the chains 15, 16. The driver 80 can be displaced by control cams 61, 62 fixed with respect to the frame. By appropriate formation of the control cams 61, 62, three positions of the driver apertures 65 are achievable, namely a position 65.1 in which the tool carrier 41 is coupled to the chain 16, a position 65.2 in which it is connected to both chains 15, 16 and a position 65.3 in which it is connected to the chain 15.

Figure 14:
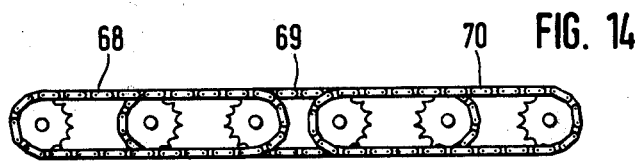
FIG. 14 is a side elevation of a chain guide consisting of three pairs of chains.
Figure 15:
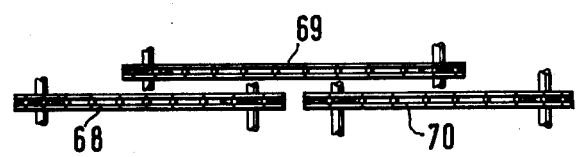
FIG. 15 is a plan view of the diagrammatic representation of FIG. 14.

FIGS. 14 and 15 illustrate an arrangement with a plurality of chains disposed behind or next to one another. In this example the chains 68 and 70 are displaceable and the chain 69 is fixed with respect to the frame so that the effective total chain length can be varied to a still larger degree between a minimum and a maximum than is possible with the example already illustrated.

Further, in this embodiment the correction of the spacings of the tool carriers can be omitted if four tool carriers are provided, two of which are moved into the crests of the chains 68 and 70 so that the other two are seated in the middle of the chain 69, and the spacing of the two chains 68, 70 from one another is subsequently varied in the same manner relatively to the chain 69. The intervals between the tool carriers will then always remain constant.

We claim:

1. Apparatus for processing a moving web of material without a standstill at positions disposed at particular longitudinal intervals, comprising a plurality of tool carriers adapted to accept operative tools for performing said processing on said web which are guided in opposing pairs on endless chains arranged in front of and behind and on both sides of a planar processing path determined by the moving web and wherein a said opposing pair of guided tool holders are located in front of and behind said planar path and each pair serving to attach an opposing operative tool disposed transversely of the web and enclosing the web therebetween, the tool carriers being guided in endless circulating paths, characterised in that the semi-circular guide path curves (40) of the circulating paths, which curves are connected by rectilinear guide path sections entering at a tangent, are displaceable and settable relatively to one another to change their lengths said tool carriers (14) being movable along the circulating paths by juxtaposed parallel and overlapping endless chains (15, 16) guided over sprockets (23 to 26) of which the shafts (23.1 to 26.1) are relatively displaceable and settable in pairs in a manner corresponding to the displaceable portions of the circulating paths, the runs of the chains extending in one plane or at the same elevation at the zone of overlap, that the link pins or lugs of the chains are provided with extensions (28) which, in the overlapping section, are directed towards one another and leave a gap between each other, and said tool carriers (14) moving in circulating paths have at least two receptacles (30) engaging a corresponding number of successive extensions in the overlapping section, at the start of which the extensions (28) of one chain enter the receptacles (30) and at the end of which the extensions (28) of the other chain leave same.

2. Apparatus according to claim 1, characterised in that the shafts of each pair of relatively displaceable chains are mounted on carriers or supporting plates (34, 38) which are connected to a respective one of the relatively displaceable parts of the circulating paths.

3. Apparatus according to claim 1 characterised in that each guide path is formed in two parts and the shafts of one of the two relatively displaceable pairs of chains (15, 16) are mounted on each of the relatively displaceable parts.

4. Apparatus according to claim 1 characterised in that each guide path is formed in three parts and three pairs of chains (68, 69, 70) are provided, and that the central pair (69) is fixed and the two outer pairs (68, 70) are displaceable relatively to the central pair (69).

5. Apparatus according to claim 1 further comprising drivers (52) connected to the link pins or elements (51) and said tool carriers being releasably secured to said drivers.

6. Apparatus according to claim 5, characterised in that the drivers (52) comprise lateral teeth (53) engaged by disengageable racks (55) of the tool carriers (14).

7. Apparatus according to claim 6, characterised in that the racks (55) are displaceably mounted on a carrier (54) and held in engagement with the teeth (53) of the driver (52) by a catch spring (57).

8. Apparatus according to claim 7, characterised in that to lift the racks (55) from the driver (52), the racks are provided with rollers (58) co-operating with control cams (59) for spreading same.

* * * * *